July 7, 1936.　　　　F. BITTER　　　　2,046,717

MAGNETIC MATERIAL AND PROCESS FOR PRODUCING SAME

Filed Sept. 18, 1934　　　3 Sheets-Sheet 1

WITNESSES:
Leon J. Vaza
C. F. Bryant

INVENTOR
Francis Bitter
BY
Ezra W. Savage
ATTORNEY

July 7, 1936.  F. BITTER  2,046,717
MAGNETIC MATERIAL AND PROCESS FOR PRODUCING SAME
Filed Sept. 18, 1934  3 Sheets-Sheet 2

WITNESSES:

INVENTOR
Francis Bitter
BY
ATTORNEY

July 7, 1936.  F. BITTER  2,046,717
MAGNETIC MATERIAL AND PROCESS FOR PRODUCING SAME
Filed Sept. 18, 1934  3 Sheets-Sheet 3

WITNESSES:

INVENTOR
Francis Bitter
BY
ATTORNEY

Patented July 7, 1936

2,046,717

UNITED STATES PATENT OFFICE 2,046,717

MAGNETIC MATERIAL AND PROCESS FOR PRODUCING SAME

Francis Bitter, Pittsburgh, Pa., assignor to Westinghouse Electric & Manufacturing Company, East Pittsburgh, Pa., a corporation of Pennsylvania Application September 18, 1934, Serial No. 744,516

13 Claims. (Cl. 148—12)

My invention relates to magnetic materials and it has particular relation to an improved character of, and one preferred process for producing, such materials in sheet-like form which, particularly at high flux densities, exhibit highly enhanced permeability and other magnetic properties.

Magnetic material in laminated or sheet form is extensively utilized in the manufacture of a wide variety of electrical apparatus, notably transformers, induction regulators, dynamo electric machines, and other comparable equipment in which substantial quantities of magnetic flux must be linked with electrical conductors. To reduce the size, weight and cost of such equipment the physical dimensions of the magnetic circuit parts which serve to conduct this flux should be kept as low as possible. It is thus desirable that magnetic material used in the construction of electrical apparatus possess high permeabilities at high flux densities, since in building transformer cores, for example, the higher the high density permeability of the material employed the smaller the transformer may be made for a given capacity. In the interests of apparatus efficiency the ideal material should also have relatively low hysteresis and other power loss characteristics.

Generally stated, the object of my invention is to produce magnetic materials in sheet form which have magnetic characteristics so substantially enhanced as to greatly increase the utility of the materials in the manufacture of electrical apparatus.

A more specific object of my invention is to provide magnetic material in laminated form which, at high flux densities, exhibits permeability characteristics far in excess of those heretofore obtainable.

Another object of my invention is to provide an improved method or process for manufacturing sheets of magnetic material which produces in them high permeabilities at high flux densities together with relatively low hysteresis and other power losses.

My invention is predicated upon the discovery that the sheet or other physical form of magnetic material having the highest permeability at high flux densities is that in which the grains are so oriented that the direction of easy magnetization through the grain crystals coincides with the direction of magnetization of the material sheet. My invention specifically contemplates the production, to a degree of completeness heretofore unattainable, of a preferred grain or crystal orientation in sheets of magnetic metal. For materials of the class typified by iron, I prefer to achieve these desired results by additionally rolling the sheets cross-wise or at an angle of 90° to the usual single direction of rolling, and subsequently relieving, by a proper annealing treatment, the internal strains set up during this fibering process in order that the enhancement of permeability may also be accompanied by a proper control of hysteresis loss characteristics.

The electrical steel of commerce today is an alloy of low-carbon steel and silicon, in which the silicon content ranges from about ½% to 5%, which is processed into sheets of a thickness of the general order of 0.014 inches. The upper limit in the practical thickness range for such sheets depends upon the eddy current loss which is permissible in the magnetic circuits in which the sheets are to be placed, while the lower limit is dictated by the cost with which the sheets may be made and handled. The permeability of such laminated material, when manufactured by ordinary sheet mill practice, decreases, at the higher densities at which it is found advantageous to operate electrical apparatus, to relatively low values, it being of the order of 250 at 16,000 lines per square centimeter. Such material, which may be characterized by large or small grain size depending upon the particular process adopted by the manufacturer, has been made with a guaranteed 60 cycle watt loss of 0.55 to 0.60 watts per pound at 10,000 lines per square centimeter.

When commercial steel comparable to that above mentioned is produced in accordance with the improved process of my invention a permeability of as high as 4000 is observed at a flux density of 16,000 lines per square centimeter. The 60 cycle hysteresis loss at 10,000 lines per square centimeter is approximately 0.68 watts per pound for material having these highly enhanced permeability characteristics, and that loss may be reduced far below the values stated for the prior art material by a sacrifice in the degree of enhancement of the permeability, the compromised value of which is still greatly in excess of that of such previously known materials.

My invention itself, together with additional objects and advantages thereof, will best be understood through the following description of a specific embodiment when taken in conjunction with the accompanying drawings, in which.

Figure 1:
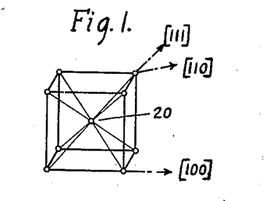
Figures 1 and 2 are representations of the manner in which the atoms are arranged in single crystals of the two classes of magnetic materials respectively typified by iron and by nickel.
Figure 2:
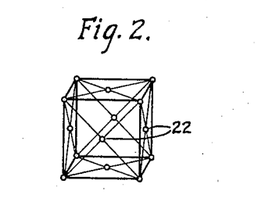

Referring to the drawings, I have there illustrated in Figs. 1 and 2 the relative positioning of the atoms in a single crystal of magnetic material of the two classes respectively typified by iron and nickel. In both classes the crystal is in the form of a cube having an atom positioned at each of the eight corners thereof. In the class typified by iron, and many of the now commercially known magnetic alloys thereof, each crystal in addition has at the geometric center thereof another atom indicated at 20 in Fig. 1. Each of these crystals is commonly termed a body-centered cubic structure. In the class typified by nickel, and combinations of nickel and other metals, such as iron, up to given or critical percentages, each crystal, which is commonly termed a face-centered cubic structure, has at the center of each of the six faces thereof an additional atom indicated in Fig. 2 at 22.

Figure 3:
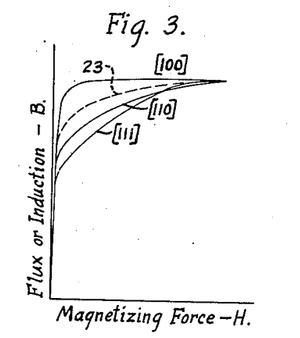
Figs. 3 and 4 are diagrams of curves respectively illustrating certain magnetic characteristics of the crystals of Figs. 1 and 2.

It is known that such cubic crystals possess different magnetic characteristics along different of their axes, which differences are represented by the magnetic saturation curves of Figs. 3 and 4. Considering first the crystal structure of Fig. 1, the direction of easiest magnetization, to which the curve (100) of Fig. 3 applies, is along any one of the three tetragonal axes, one of which is indicated in Fig. 1 at (100), and each of which defines a direction perpendicular to a face of the structure. Ranking next in ease of magnetization is any one of the directions from one corner of a face of the structure to the diagonally opposite corner of the same face. The diagonal axis of one such direction is indicated in Fig. 1 at (110), which symbol also designates in Fig. 3 the applicable magnetization curve. Ranking last in order of magnetizability, as typified by curve (111) of Fig. 3, is any one of the directions diagonally through the cube, determined, as indicated in Fig. 1 at (111), by any one of the trigonal axes drawn from one corner of the structure to the diagonally opposite corner.

Figure 4:
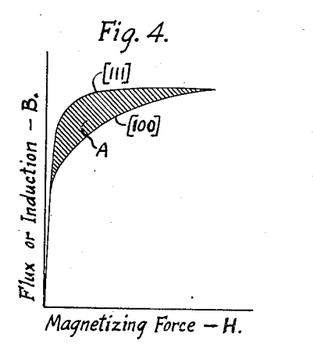

The face-centered crystal structure of Fig. 2, however, differs in the respect that its line of easiest magnetization is determined by the (111) axis, and its direction of most difficult magnetization by the (100) axis, as is indicated in Fig. 4. Such a reversed relation exists for nickel in the pure state, and for alloys of nickel and iron up to approximately 20% iron, at which point the curves (100) and (111) of Fig. 4 substantially coincide, thereby reducing the area A to zero. Increase in the percentage of iron above 20% in a nickel-base alloy causes the crystal characteristics to start to approach those depicted in Fig. 3 for the body-centered structure. These characteristics of Fig. 3 are exhibited not only by pure iron but also by alloys of iron with small amounts of any element that will go into solution. Examples of such elements are silicon, which at the present time finds the greatest commercial application in ferro-magnetic materials, and also aluminum, nickel, copper, manganese and others.

Figure 5:
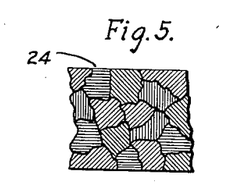
Figs. 5 and 6 are representations of magnetic materials respectively having a random and a preferred orientation of the axes of their grain or crystal structures.

In the case of magnetic material of the non-fibered or randomly oriented grain variety, the material when subjected to examination, as by an X-ray, elastic deformation, or magnetic testing apparatus in manners to be further explained, reveals the condition which is represented in Fig. 5. In that figure each of the cross-hatched areas 24 represents an individual grain of the metal, and the parallel lines drawn through each of these areas are assumed to indicate the direction of easiest magnetization of the grain. Each of these grains is made up of a large number of the cubic crystal structures previously described which are arranged side by side in a regular or parallel manner. In effect, therefore each of the grain assemblages exhibits magnetic characteristics comparable to those of each of the individual crystal structures of which it is made up. In other words, each grain 24 is possessed of the three different axes (100), (110) and (111) in the respective directions of which the magnetizing characteristics are for body-centered crystal material, for example, as depicted by the curves of Fig. 3.

For the random orientation of the crystal grains depicted by Fig. 5, the distribution of the grain axes is substantially the same in all directions, and no particular direction can, therefore, be said to be preferred. Consequently, the highest attainable magnetic property of the material of Fig. 5 may be expected to be of some average order such as is indicated by the dotted curve 23 in Fig. 3 which in effect represents the average of the three full-line curves. Such a random orientation, or a substantial approach thereto, is characteristic of the prior art magnetic materials with which I am familiar and it thus helps to explain the inferior magnetic characteristics of these materials as compared with those prepared in accordance with the teachings of the present invention.

Figure 6:
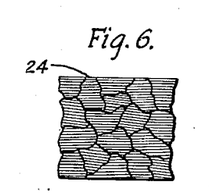

In Fig. 6, I have illustrated the condition of a magnetic material in which the individual crystal grains 24 are all lined up in substantially the same direction. This arrangement, sometimes spoken of as fibering, causes the material to exhibit preferential directions of easy magnetization which directions I take advantage of in the practice of my invention. Such a preferred orientation may, to a partial extent at least, be produced by plastically deforming the material or by annealing or heat treating it. Familiar methods for effecting plastic deformation are rolling, wire-drawing, hammering or other like forms of mechanical working which permanently deform or change the shape and position of the material grains.

Figure 7:
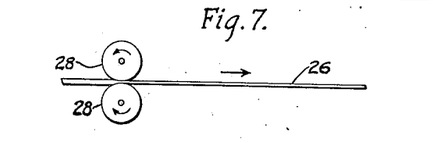
Fig. 7 is a simplified representation of the conventional manner in which a sheet of magnetic material is passed between two pressure rolls for the purpose of reducing its thickness.
Figure 8:
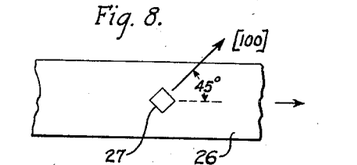
Fig. 8 is a plan view of the sheet of Fig. 7 upon which is indicated the manner in which each one of the crystals in material of the class typified by iron tends to orient itself with respect to the direction of rolling.

Of these methods rolling is by far the best adapted to reduce material to sheet form and hence is the one which I have found to be the most convenient and effective for achieving the objects of the present invention. Apparatus for performing a simple rolling operation is illustrated in Fig. 7, in which I have represented at 26 a sheet of material which is being passed between a pair of compressing rolls 28. I have observed that such a passage has the tendency to orient, in the case of a ferro-magnetic material, the (110) axes of the crystal structures, one of which in greatly magnified form is represented at 27 in Fig. 8, in a direction parallel to the direction of rolling. As a consequence, the (100) axes of the crystals tend to line themselves up, as is also indicated in Fig. 8, in a direction displaced 45° from the direction of rolling. Hence it is observed that in a sheet of ferro-magnetic material thus rolled in a single direction the direction of easiest magnetization tends to lie along a line displaced 45° from the direction of the rolling.

When materials of the nickel or face-centered cubic crystal class are similarly rolled, a somewhat different result is produced, the tendency being for the crystal structures to line up with their (111) axes parallel to the direction of rolling. In the case of this class of materials, the phenomenon is considerably more complicated than is that of the body-centered cubic material, about which material much more at the present time is known and with which class of material the present invention is most directly, though not exclusively, concerned.

While rolling in a single direction effects some improvement in the 45° direction characteristics of ferro-magnetic materials, this improvement is relatively slight as compared with that possible under the teachings of my invention. I have observed that the rolling of the sheet material in the single direction, while relatively effective in aligning certain of the (110) axes of the crystals parallel to the direction of rolling, is ineffective in aligning the comparable axes, designated in Figs. 9 and 10 at (110), which are perpendicular to those first named, into the preferred position parallel to the surface of the rolled sheet. An example of this variance is indicated by the dotted crystal representation 27' of Fig. 10. Since this second alignment is also essential in enhancing to the greatest possible extent the magnetic characteristics in a direction 45° from that of the rolling, the preferred orientation resulting from such a single direction of rolling is therefore relatively incomplete.

I have discovered that if the sheet material is, during the final stages of its thickness reduction, also rolled in a direction displaced by substantially 90° from that of the usual lengthwise rolling, the (110) axes just mentioned may likewise be effectively aligned parallel to the surface of the sheet and the above-named disadvantage thereby eliminated. Consequently, in practicing the preferred fibering process of my invention, I change the direction of the consecutive rollings, employed to reduce the sheet material to the final desired thickness, by approximately 90° and in this manner I secure in ferro-magnetic materials a degree of completeness of preferred orientation which heretofore has been unattainable. While such improvement in orientation is an effect definitely known, and which may be evidenced by X-ray and other conventional forms of analysis, I have reason to believe that other effects may likewise accrue. For example, different and advantageous distributions of internal strains may result, which also may partially account for the observed improvement in the quality of the material for magnetic purposes.

Figure 11:
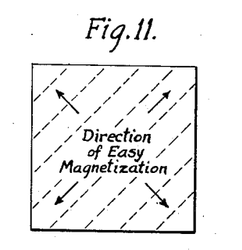
Fig. 11 is a view illustrating the directions of easiest magnetization in a sheet of magnetic material of the class typified by iron which result from application of the cross-rolling treatment of the present invention.
Figure 12:
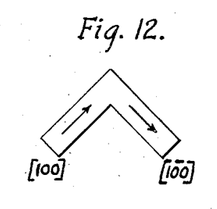
Fig. 12 is a view indicating one manner in which an L-shaped section of transformer or other magnetic circuit lamination may be cut from the sheet of Fig. 11 to take full advantage of the directions of easy magnetization.

In Fig. 11, I have indicated along two of the sides of a sheet of material the directions of the 90° displaced consecutive rolling operations preferably applied in accordance with my invention. Inasmuch as the (100) axes of the ferro-magnetic crystals are thereby aligned in directions displaced by 45° from the directions of rolling, the coinciding directions of easy magnetization are as indicated by the arrows inside of the sheet outline. There appears to be no preference among these four 45° directions, so that from a sheet of material prepared by the process of my invention, it is possible to stamp out L-shaped laminations of the type shown in Fig. 12, each leg of which equally possesses the enhanced magnetization properties. Such L-shaped elements are, as is known, now extensively utilized in the construction of transformer and other like apparatus cores, and hence the process of my invention is of an exceedingly practical nature. If straight strips only are required these may be cut diagonally from the sheet as indicated by the dotted lines of Fig. 11.

Figures 13, 14, 15:
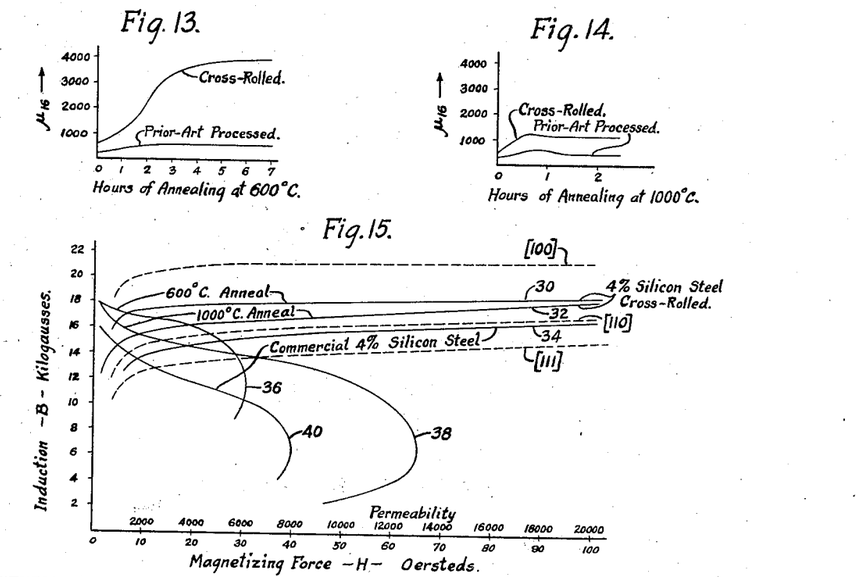
Figs. 13 and 14 are diagrams of curves illustrating the magnitude of improvement in permeability which the cross-rolling process of my invention makes possible.
Fig. 15 is a diagram of saturation and permeability curves further illustrating the degree of characteristic improvement made possible by the process of my invention.

In Figs. 13, 14, and 15, I have illustrated, by means of curves, the enhanced characteristics which a sheet of 4% silicon steel 0.014 inch in thickness exhibited after preparation and treatment in accordance with my invention.

In this preparation, stock of a commercial grade of 4% silicon iron alloy was, for the purpose of removing oxides and other impurities from the material, first melted in an induction furnace in the presence of hydrogen, the metal there being maintained at a temperature slightly in excess of its melting point, and the hydrogen being exposed to and passed through the molten metal for a period somewhat in excess of 15 minutes. The purified metal was then allowed to solidify into an ingot, and this ingot was reduced by standard and previously employed processes of forging and rough rolling, at temperatures of the general order of 1,000° C., into a plate-like sheet bar. This bar was next hot-rolled, at a temperature of between 800° and 1,000° C., into match plates which in thickness approximated one-eighth or 0.125 of an inch. Each thus rolled plate was approximately 12 inches in width and 22 inches in length.

It is desired to here point out that the purifying operation just described is not an indispensible step in preparing the material for the cross-rolling process of my invention, it merely allowing the final magnetic characteristics to reach a somewhat higher order than when unpurified materials are by it reduced to thin sheets. Consequently, the steps about to be detailed are equally applicable to sheet bars of either purified or unpurified ferro-magnetic material. As will become apparent, furthermore, these particular operations to be described are merely illustrative of my new process of treatment and in no way are they limiting or restrictive.

In applying the process of my invention to the match plates prepared as above explained, these plates were heated in a furnace to a temperature of about 700° C., this temperature having been found to be the minimum one convenient for subsequent rolling operations. In the interests of producing the most effective graining in the material, as low a temperature as possible is desired, low temperature rolling in general producing better orientation than does high temperature rolling.

The thus heated 12 by 22 inch match plates were then cross-rolled, in a direction displaced from that of the previous rolling by 90°, in pairs to a thickness of about 0.062 inch, which thickness reduction approximately doubled the plate dimension in the direction of rolling. Each of the resulting 24 x 22 inch plates was then prepared for the next rolling operation by first being trimmed to a square 22 inches on one side.

Next these 0.062 inch plates were reheated to approximately 700° C., and rolled in a direction displaced by 90° from that of the preceding rolling, in stacks of four, to a thickness of 0.030 inch. This extended the dimension in the direction of rolling to 45 inches. Each of the resulting plates was then cut in two and the halves sheared to 22 by 22 inches each.

The sheared sheets were again heated to 700° C. and cross-rolled in stacks of eight to the final thickness of 0.014 inch. During this rolling, which was at 90° to the direction of the previous operation, the dimension in the direction of rolling was increased to 47 inches, the dimension at right angles to the rolling remaining at 22 inches. In this form, the 0.014 inch sheets constituted the finished product insofar as the rolling operations were concerned. This product exhibited the characteristics depicted by Figs. 13 and 14.

It will be noted that in the described cross-rolling operations each consecutive step of rolling reduced the thickness of the sheet to approximately one-half its former value and thus substantially doubled the sheet dimension in the direction of rolling. Such a relation while not absolutely essential is highly preferable inasmuch as it allows practically all of the material to be progressively rolled without changing the effective width of effective roll engagement, the mentioned halving of the sheets before each succeeding operation accomplishing this objective. It will be apparent, however, that other reducing and sheet extending relations may, if desired, be employed in applications of the cross-rolling process of my invention, and that the number of passes through the rolls is restricted only by convenience.

As is indicated by the curves of Figs. 13 and 14, which apply to a representative flux density of 16,000 lines per square centimeter, the material as taken from the rolling mill exhibited a permeability which, while relatively low, was considerably in excess of that of material of the same composition when reduced to the final thickness of 0.014 inch by the usual single-direction rolling process. Upon annealing this 4% silicon steel sheet at a temperature of 600° C., the permeability of the cross-rolled sample was found to increase rapidly, apparently because of a reduction of the internal strains which had been set up by the rolling operations, it rising after a period of seven hours to substantially 4000 at the named flux density. The permeability of the prior art processed sample on the other hand, rose only to about 600, as indicated by Fig. 13. While the prior art prepared sample exhibited a coercive force of approximately 1.0 gauss at a flux density of 10,000 lines per square centimeter and a frequency of 60 cycles, the cross-rolled sample exhibited a coercive force of only 0.7 gauss and a correspondingly reduced hysteresis loss.

Such a low temperature heat treatment has the advantage of leaving substantially undisturbed the graining effected by the rolling operations and from the standpoint of maximum high density permeability is therefore the variety most desired. However, reduction of hysteresis loss is not carried by it to the low point frequently preferable and from the standpoint of such loss reduction higher annealing temperatures are found to be more effective. Because such higher temperatures tend to recrystalize the grains and otherwise destroy the material fibering, many of the benefits as regards enhancement of permeability must of necessity be sacrificed when higher temperature anneals are applied.

In practice, the most satisfactory material is found to be one annealed at a compromised or intermediate temperature which, while sufficient to substantially reduce the hysteresis losses, still permits such a substantial portion of the original graining to be retained as to preserve much of the permeability improvement which the cross-rolling makes possible. One such intermediate temperature is of the order of 1,000° C.

The results of an annealing at 1,000° C. are depicted in Fig. 14, in which the final permeability attained is approximately 1,200, at a flux density of 16,000 lines per square centimeter, for the cross-rolled 4% silicon steel. When so treated, the coercive force was found to be reduced to 0.3 gauss, and the hysteresis loss was only 0.30 watt per pound at a 60 cycle flux of 10,000 lines per square centimeter. This material represents a substantial improvement over any prepared by previously known processes.

The magnetization curves of the cross-rolled 4% silicon steel annealed at 600° and at 1000°

C., are depicted at 30 and 32 in Fig. 15. As compared with 4% silicon steel prepared by the usual straight-rolling the curve of which is shown at 34 in Fig. 15, it will be seen that very substantial improvements have been realized through application of the process of my invention. Comparison with the magnetization curves (100), (110) and (111) which apply to the three similarly identified axes of a single crystal of iron shows the degree with which the magnetic steels of my invention approach the ideal or (100) curve. Permeability curves derived from the magnetization curves 30, 32, and 34 are respectively shown at 36, 38, and 40. This derivation was made by applying the equation $$\text{Permeability } (\mu) = \frac{\text{Induction (B) in gausses}}{\text{Magnetizing force (H) in oersteds}}$$

From these curves the marked improvement in high density permeability which magnetic material sheets prepared in accordance with my invention exhibit is at once apparent. For electrical uses, as already indicated, improvement within these high flux density ranges is of particular practical importance and advantage.

Further examples of the effect of annealing upon the improved characteristics of 4% silicon steel when cross-rolled to a thickness of 0.014 inch in accordance with the process of my invention are presented by the following table I from which it will be further noted that as the annealing temperature is raised both the permeability and hysteresis loss characteristics decrease in magnitude.

Table I

| Annealing temperatures | Permeability at magnetizing forces of | | | Hysteresis loss for 60-cycle flux maximum density of 10 kilogausses |
|---|---|---|---|---|
| | 5 oersteds | 20 oersteds | 100 oersteds | |
| °C. | | | | Watts per lb. |
| 600 | 2723 | 835 | 185 | 1.32 |
| 700 | 3162 | 855 | 186 | 0.95 |
| 800 | 3233 | 868 | 185 | 0.68 |
| 900 | 3007 | 815 | 181 | 0.41 |
| 1000 | 3013 | 813 | 182 | 0.30 |
| 1100 | 2963 | 800 | 181 | 0.22 |
| 1200 | 2963 | 803 | 183 | 0.16 |
| 1300 | 2882 | 785 | 180 | 0.16 |

Nor are the beneficial results just explained restricted to the 4% silicon steel specifically mentioned, since when applied to other comparable materials containing different proportions of silicon, equally beneficial results have been observed. In the case of 3% silicon steel, I have listed in the following Table II certain of the outstanding characteristics which 600° C. annealed samples from 0.014 inch sheets prepared in accordance with my invention and by the prior art methods have been found to exhibit:

Table II

| Sample of 0.014 inch sheet of 3% silicon steel prepared by | Permeability at flux density in kilogausses of | | | Coercive force at 10000 gausses and 60 cycles |
|---|---|---|---|---|
| | 8 | 12 | 16 | |
| Cross-rolling | 6700 | 6300 | 3200 | 0.6 |
| Straight rolling | 4400 | 3000 | 450 | 0.9 |

The above table illustrates the marked improvements both in permeability and hysteresis loss characteristics which result from the application of my cross-rolling process of sheet reduction to 3% silicon steel.

These improvements in magnetic characteristics appear, as already indicated, to result from the highly preferred orientation of the material grains, which preferred orientation must thus be present in the material in its finally annealed state if the benefits of my invention are to be availed of. Not only does cross-rolling produce a much more complete fibering than does straight rolling, but it also renders the orientation less easily destructible by the annealing treatment and for this reason it is of particular advantage and utility.

In addition to producing enhanced permeability characteristics at high flux densities, this preferred orientation of the magnetic material grains evidences itself in a number of other manners certain of which may be observed by the use of X-ray, magnetic and elastic deflection testing apparatus. The X-ray method of analysis as extensively used in the past requires a relatively large number of exposures through different sections of the sample in order to get purely representative or average results. For this reason it is less convenient to determine fibering than the magnetic and elastic deflection methods of test. Equipments for the making and representative results of these two types of tests are respectively illustrated by Figs. 16 to 18 inclusive and by Figs. 19 to 22 inclusive. Each of the illustrated equipments requires that the specimen of the material to be tested be in the form of a circular disc, such as is indicated at 50 in the several figures.

Figure 16:
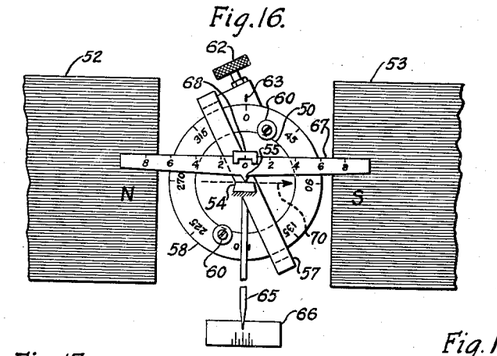
Fig. 16 is a simplified representation of one form of magnetic testing apparatus which may be utilized to indicate the degree of fibering of sheet magnetic material.
Figure 17:
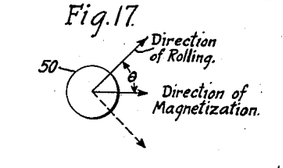
Fig. 17 is a diagram showing how the position of a circular specimen of the material is varied during the course of test by the equipment of Fig. 16.

Considering first the magnetic testing apparatus of Fig. 16, a preferred form of that equipment comprises a magnetic circuit which includes a pair of separated pole pieces 52 and 53 between which a very high intensity of unidirectional magnetic flux is caused, by suitable exciting means (not shown), to flow. Supported from a pair of stationary supports, the front one of which is shown at 54, by cooperating knife edges 55 is a yoke structure 57 which carries a member 58 into a suitably deformed depression in which the circular sample 50 of the material to be tested may be fitted and secured by means of screws 60. In the secured position the sample lies within a vertical plane which coincides with the direction of flux passage between the two pole pieces.

By means of an adjusting screw 62 the sample carrying member 58 may be rotated relative to the supporting yoke 57, the amount of such rotation being indicated in degrees by the scale carried by member 58 and a reference line 63 carried by the yoke structure. This structure carries a pointer 65 which a rocking or rotation of the structure causes to move along a stationary scale 66, and a graduated balancing bar or arm 67 along which a slidably mounted weight 68 may be moved in either direction from the central position in which the weight is illustrated.

In preparing the equipment for operation, the sample 50 is so attached to the supporting member 58 that the reference direction of rolling, indicated by the dotted arrow 70, of the sheet material from which the sample was stamped, is alined with the 90° point on the scale of the member. When now this member is set, as illustrated, with the 0° point on its scale coinciding with the supporting-yoke structure reference mark 63, the magnetic field will in passing from one pole piece of the testing apparatus to the other flow through the sample in a direction which is coincident with that in which the sample material was rolled. A shifting of the sample carrying member 58 in the yoke structure 57, effected by the adjusting screw 62, then displaces the reference direction of sample rolling from the direction of flux flow by an angle, represented by θ in Fig. 17, which is directly indicated by the carrying member scale.

The intensity of the magnetic field produced by the testing apparatus is sufficiently high to assure that the flux will always flow through the sample in the same direct path, which in the illustrated equipment is horizontal. For material of the completely non-fibered or randomly oriented grain variety in which the magnetic characteristics are the same in all directions, there will be substantially no torque set up in the circular test specimen by the passage of flux therethrough regardless of its rotational position in the apparatus and the pointer 65 will remain in the indicated central position as long as the balancing weight 68 is at the center of the graduated arm 67.

However, when the sample 50 is of a highly fibered or preferentially oriented grained variety which possesses preferred directions of easy magnetization, there will be certain rotational ranges where appreciable values of torque are set up by the flow of magnetic flux therethrough. The apparatus of Fig. 16 measures, for as many different rotational settings as it is desired to observe, this torque in terms of the position along the scaled arm 67 to which the weight 68 must be moved to bring the pointer 65 to the illustrated central position. Positions of the weight along the arm 67 on one side of its zero or central point thus indicate positive torques while positions on the opposite side indicate negative torques.

One explanation for the production of torque in the specimen is the action of the forces within the crystals which tend to tie the direction of magnetization with certain of the crystal axes. The torque which results from the action of these forces is the rate of change of magnetic energy with the angle of displacement of these axes from the actual direction of flux flow.

Figures 18, 20:
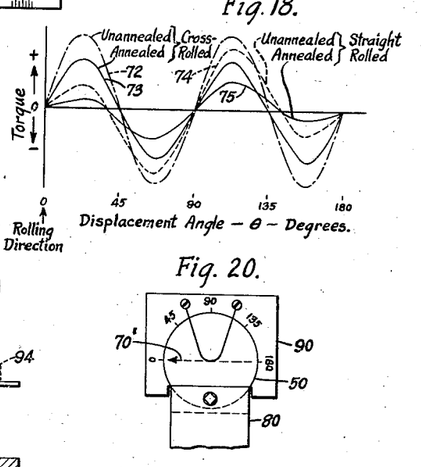
Fig. 18 is a diagram of curves depicting the comparative results of tests made by the apparatus of Fig. 16 upon magnetic steel reduced to sheet form by the process of this invention and by prior art methods.
Fig. 20 is a view of an auxiliary member utilized to predeterminedly position the circular test specimen in the apparatus of Fig. 19.

In Fig. 18 I have illustrated the results of tests made upon samples taken from 0.014 inch sheets of 4% silicon steel prepared by the cross-rolling process of my invention before (curve 72) and after (curve 73) the material was annealed and comparative results obtained from samples prepared by the prior art or usual straight rolling process also in the unannealed (curve 74) and the annealed (curve 75) state. In all cases, the zero point on the horizontal scale of the curves indicates the direction of rolling in the case of the straight-rolled samples and one of the two 90° displaced directions of rolling in the case of the cross-rolled material.

It will be noted that as the direction of magnetization of the cross-rolled specimens is displaced from the reference direction of rolling, the magnetic field exerts upon the specimen a value of positive torque which progressively rises and then decreases to again become zero at 45° where the direction of test flux coincides with one of the directions of easy magnetization of the test material. Further displacement causes the torque to reverse and follow an exactly similar variation of negative values, it again becoming zero at 90°. At 135° displacement the torque curves again pass through zero in the direction from positive to negative which indicates a second direction of easy magnetization of the cross-rolled material.

Figure 9:
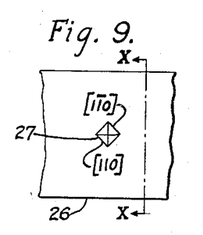
Fig. 9 is an enlarged view of a portion of the rolled sheet of Fig. 8.
Figure 10:
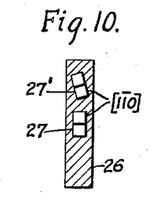
Fig. 10 is a view, taken on line X—X of Fig. 9, of a section of the sheet conventionally rolled in but a single direction showing the tendency of certain of the crystal axes to disperse from their most effective alignment.

Whereas the curves 72 and 73 for the cross-rolled samples are symmetrical throughout the entire displacement range, the curves 74 and 75 for the straight-rolled material are highly unsymmetrical, the reason for this dissymmetry appearing to be the poor or incomplete alignment of certain of the diagonal axes (indicated at (110) in Figs. 9 and 10) of the crystal grains. In any case, the marked improvement in the fibering which cross-rolling effects is clearly indicated by the curves of Fig. 18. These curves likewise show the tendency for annealing to destroy this fibering, which tendency is evidenced by the fact that as the annealing temperature is raised the sample exhibits less and less torque variations when magnetically tested, the decrease, however, being much less for the cross-rolled material than for that prepared by the usual straight rolling, as the curves also indicate. The large torque variations evidence a more complete degree of material fibering than do smaller changes with displacement. From the illustrated curves the advisability of annealing at as low a temperature as is permissible will become apparent.

Figure 19:
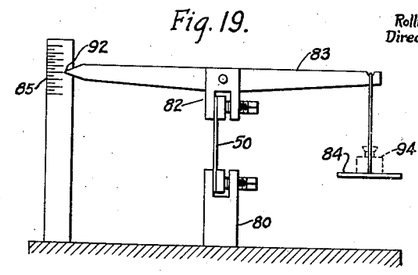
Fig. 19 is a representation of a second or elastic deformation type of apparatus which may be used to test the graining characteristics of magnetic material sheets.
Figure 21:
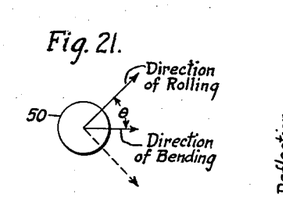
Fig. 21 is a diagram showing how a specimen of material is positionally varied during the course of test by the equipment of Fig. 19.

There also appears to be a rather definite relation between grain orientation and the elastic properties of the sheet magnetic material, which relationship may be determined by means of the elastic deformation testing equipment illustrated in Fig. 19, which measures these properties in terms of specimen bending. This equipment comprises a stationarily mounted support 80 into which one side of the circular specimen 50 is clamped and a cooperating structure in the form of a second clamping member 82, adapted to engage the opposite or top side of the sample, and a bar or beam 83 attached thereto. From one end of this bar a weight pan 84 is suspended while the other end is in the form of a pointer 92 which moves along a stationarily mounted scale 85 when a bending torque is exerted upon the test specimen by the placement of a weight 94 in the pan.

To aid in properly inserting the specimen and to determine the position of its reference rolling direction 70' with respect to the direction of bending, I have found the use of the fixture shown in Fig. 20 exceedingly helpful. This fixture comprises the illustrated block 90 in which there is a recess of such character as to accommodate the circular specimen and along the edge of which recess a scale graduated in degrees is positioned.

Figure 22:
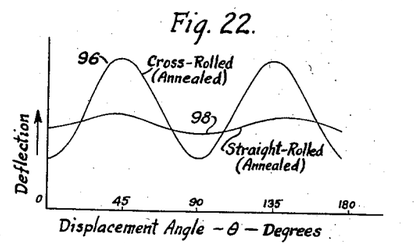
Fig. 22 is a diagram of curves depicting the comparative results of tests made by the apparatus of Fig. 19 upon magnetic steel reduced to sheet form by the process of this invention and by those of the prior art.

By inserting the specimen 50 into this recess and aligning the reference direction 70' at different points along the graduated scale for successive test observations, the data for the curves of Fig. 22 may be obtained. Each of these observations consists in noting the position of the pointer 92 along the scale 85 before and after the weight 94 is placed in the pan 84. The magnitude of bending of the sample when subjected to the same given torque is indicated by the amount of change of position of the pointer which in turn depends upon the compressive and extensive elasticities of the material in the region of bending.

As indicated by the curve 96 of Fig. 22, which curve is of symmetrical character, the direction of easiest bending of the cross-rolled sample coincides with the 45° and 135° displacement points from the reference direction of rolling.

As compared with the straight rolled or prior-art processed specimen the test results of which are indicated by curve 98, which it will be observed is somewhat unsymmetrical, the cross rolled material exhibits a much greater degree of grain orientation.

It will thus be seen that the described process of my invention affords means of producing ferro-magnetic material in sheet-like form having characteristics far superior to those obtainable through the use of any process previously known. Furthermore, the basic idea of producing a highly preferred orientation in magnetic materials to enhance their permeabilities at high flux densities is capable of broad application and may be extended to materials of the face-centered cubic crystal variety, typified by nickel, with comparably beneficial results. In such application, however, the different magnetic characteristics of the individual crystals and their different behavior when subjected to plastic deformation and annealing must, of course, be properly taken into account.

By the term "steel" as used throughout the specification, applicant has referred to iron-base mixtures containing carbon in any desired relatively small amount without regard to whether that quantity is or is not sufficient to produce pearlite on slow cooling. The term as here used thus includes materials in which the carbon content may be of the low order of 0.005% or even less.

Since certain changes may be made in carrying out the above process without departing from the scope of the invention, it is intended that all matter contained in the above description shall be interpreted as illustrative and not in a limiting sense.

I claim as my invention:

1. In the production of ferro-magnetic sheet material, the method of improving magnetic characteristics which comprises effecting the finishing stages of thickness reduction by rolling in two directions at substantially right angles to orient the crystallographic axes of the sheet material grains which offer the least resistance to magnetization in directions at substantially 45° from the directions of rolling, the degree of said orientation being much more complete than that which rolling in but a single direction produces.

2. In the production of ferro-magnetic sheet material, the method of improving magnetic characteristics which comprises effecting the finishing stages of thickness reduction by rolling in two directions at substantially right angles to orient the crystallographic axes of the sheet material grains which offer the least resistance to magnetization in directions at substantially 45° from the directions of rolling and then annealing.

3. In the production of ferro-magnetic sheet material, the method of improving magnetic characteristics which comprises effecting the finishing stages of thickness reduction by rolling in two directions at substantially right angles to orient the crystallographic axes of the sheet material grains which offer the least resistance to magnetization in directions at substantially 45° from the directions of rolling and then annealing to relieve strains without destroying the grain orientation.

4. In the production of ferro-magnetic sheet material, the method of improving magnetic characteristics which comprises reducing the sheet from a thickness of not more than ten times the finished size to the finished size by rolling in two directions at substantially right angles to orient the crystallographic axes of the sheet material grains which offer the least resistance to magnetization in directions at substantially 45° from the directions of rolling.

5. In the production of ferro-magnetic sheet material, the method of improving magnetic characteristics which comprises reducing the sheet from a thickness of not more than ten times the finished size to the finished size by rolling in two directions at substantially right angles to orient the crystallographic axes of the sheet material grains which offer the least resistance to magnetization in directions at substantially 45° from the directions of rolling and then annealing to relieve strains.

6. The method of producing ferro-magnetic sheet material having improved permeability characteristics at high flux densities which comprises casting material of the desired composition into an ingot, hot-working the ingot to reduce it to a thickness not exceeding several times that of the finished sheet, reducing to the finished thickness by rolling in two directions at substantially right angles to orient the crystallographic axes of the sheet material grains which offer the least resistance to magnetization in directions at substantially 45° from the directions of rolling, and then annealing to relieve strains.

7. In a method of making silicon-iron alloy which in sheet-like form exhibits enhanced permeability characteristics at high flux densities the steps consisting in casting an iron ingot of the desired silicon content, hot-working the ingot to reduce it to a thickness not exceeding several times that of the finished sheet, reducing to the finished thickness by rolling in two directions at substantially right angles to orient the crystallographic axes of the alloy grains which offer the least resistance to magnetization in directions at substantially 45° from the directions of rolling, and then raising the temperature of the sheet to eliminate strains without destroying the said grain orientation.

8. In a method of making magnetic iron alloy in sheet-like form containing up to 6% silicon and characterized by relatively high permeability and relatively low watt loss, the steps which comprise effecting the finishing stages of thickness reduction by rolling in two directions at substantially right angles, annealing the material to eliminate internal strains, and controlling the permeability and watt loss of the finished sheet by adjusting the degree and character of said annealing.

9. In a method of making magnetic iron alloy in sheet-like form containing up to 6% silicon and characterized by relatively high permeability and relatively low watt loss, the steps which comprise effecting the finishing stages of thickness reduction by rolling in two directions at substantially right angles, and heat treating the material, at a temperature not exceeding 1000° C., to develop permeability and reduce watt loss.

10. Magnetic material comprising silicon-iron alloy sheet rolled during the finishing steps of thickness reduction in two directions at substantially right angles to orient the crystallographic axes of the alloy grains in the sheet which offer the least resistance to magnetization generally in directions at substantially 45° from the directions of rolling and then annealed to release strains and produce a material having relatively low watt losses and high-density permeability characteristics of the high order typified by a permeability of 4000 at a flux density of 16,000 gausses.

11. Magnetic material comprising silicon-iron alloy sheet rolled during the finishing steps of thickness reduction in two directions at substantially right angles to orient the crystallographic axes of the alloy grains in the sheet which offer the least resistance to magnetization generally in directions at substantially 45° from the directions of rolling and then annealed to release strains and produce a material having high permeabilities at high flux densities and watt losses of the low order typified by 0.30 watt per pound in a sheet 14 mils thick when subjected to a 60 cycle flux of 10,000 gausses maximum density.

12. Magnetic material comprising silicon-iron alloy sheet rolled during the finishing steps of thickness reduction in two directions at substantially right angles to orient the crystallographic axes of the alloy grains in the sheet which offer the least resistance to magnetization generally in directions at substantially 45° from the directions of rolling and then annealed to release strains and produce a material having high density permeability characteristics of the high order typified by a permeability of 4,000 at a flux density of 16,000 gausses and watt losses of the low order typified by 0.68 watt per pound in a sheet 14 mils thick when subjected to a cycle flux of 10,000 gausses maximum density.

13. Magnetic material comprising silicon-iron alloy sheet rolled during the finishing steps of thickness reduction in two directions at substantially right angles to orient the crystallographic axes of the alloy grains in the sheet which offer the least resistance to magnetization generally in directions at substantially 45° from the directions of rolling and then annealed to release strains and produce a material having high-density permeability characteristics above the order typified by a permeability of 1000 at a flux density of 16,000 gausses and watt losses below the order typified by 0.40 watt per pound in a sheet 14 mils thick when subjected to a flux of 10,000 gausses maximum density.

FRANCIS BITTER.